United States Patent [19]

Kovar

[11] 4,306,336
[45] Dec. 22, 1981

[54] IMMOBILIZING AND HEAD-GRIPPING TOOL FOR HOLDING FISH OR ANIMALS FOR SCALING OR SKINNING

[76] Inventor: Ralph T. Kovar, 1921 S. Glenwood, Springfield, Ill. 62702

[21] Appl. No.: 158,865

[22] Filed: Jun. 12, 1980

Related U.S. Application Data

[63] Continuation of Ser. No. 922,113, Jul. 5, 1978, abandoned.

[51] Int. Cl.³ ............................................. A22C 25/06
[52] U.S. Cl. ...................................... 17/68; 81/5.1 R
[58] Field of Search ......................... 17/66, 68, 69, 70; 81/5.1

[56] References Cited

U.S. PATENT DOCUMENTS

| | | | |
|---|---|---|---|
| 715,988 | 12/1902 | Cooley et al. | 17/68 X |
| 2,030,463 | 2/1936 | Nelms | 17/68 |
| 2,785,436 | 3/1957 | Noland et al. | 17/68 |
| 4,069,551 | 1/1978 | Van Dyke et al. | 17/68 |

Primary Examiner—Willie G. Abercrombie
Attorney, Agent, or Firm—Ralph F. Staubly

[57] ABSTRACT

A pliers-like head-gripping tool for immobilizing and holding fish for skinning or scaling, or animals for skinning, has a flat-faced mouth-insertable lower jaw and an upper jaw provided with a skull-penetrating sharp-tipped conical point depending from a flat surface roughly parallel to the (preferably serrated) flat face of the upper jaw during normal use. The handle members of the tool are dip-coated with a tough and preferably slightly resilient plastic material. The lower handle member is downwardly and forwardly curved to partly embrace the hand of the user as an aid to a pulling action. The tool parts are so shaped and proportioned that the sharp tip of the point will be protectedly slightly spaced from the lower jaw surface when the handle members touch. A clip-on centrally apertured disc adjusts the tool to smaller game by reducing the effective dimensions of the conical point and the jaw gap.

10 Claims, 6 Drawing Figures

IMMOBILIZING AND HEAD-GRIPPING TOOL FOR HOLDING FISH OR ANIMALS FOR SCALING OR SKINNING

This application is a cont. of Ser. No. 922,113, July 5, 1978 now abandoned.

BACKGROUND AND OBJECTS OF THE INVENTION

Pliers-shaped tools for gripping fish or animals for scaling or skinning are known, e.g. Pittis U.S. Pat. No. 3,367,703, Van Dyke et al U.S. Pat. No. 4,069,551 and Vogt U.S. Pat. No. 4,054,969, and other U.S. patents cited therein. But none is known having the herein disclosed type of gripping jaws with a bluntly tapered sharp-tipped conical skull-penetrating game-immobilizing point for providing large-area smooth, and thus tear-resisting, holding surfaces *both on and in* the tissue being gripped. It is thus the principal object of this invention to provide such a tool having not only relatively flat-faced opposed gripping faces but also at least one relatively large bluntly tapered sharp-tipped smooth skull-penetrating game-immobilizing point for providing a smooth tear-resisting holding surface in the object to be gripped. Other objects and advantages will become apparent as the following description proceeds.

BRIEF DESCRIPTION OF THE DRAWING FIGURES

DETAILED DESCRIPTION

Figure 1:
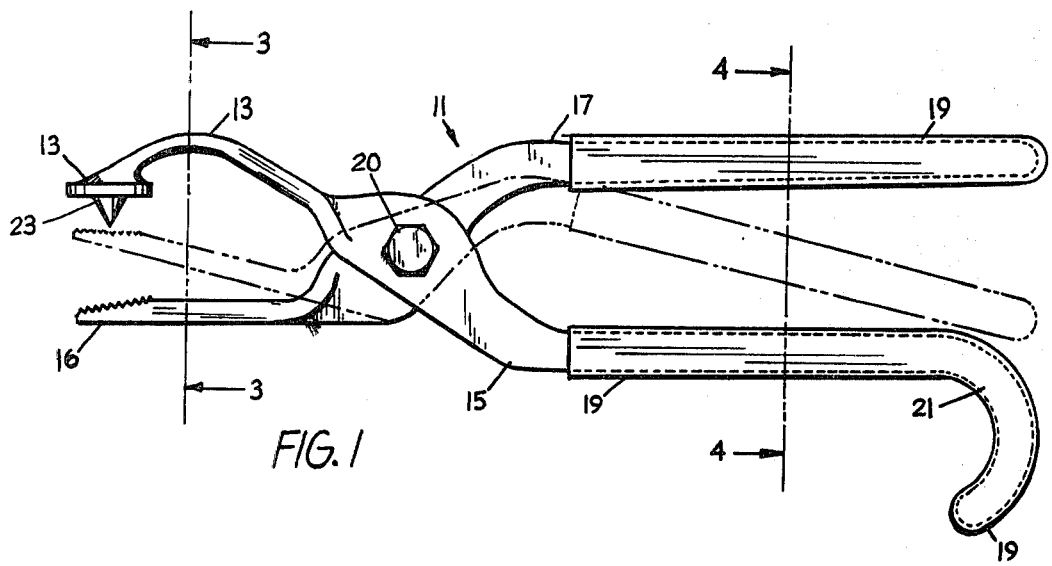
FIG. 1 is a side elevational view of a preferred embodiment of the invention.
Figure 2:
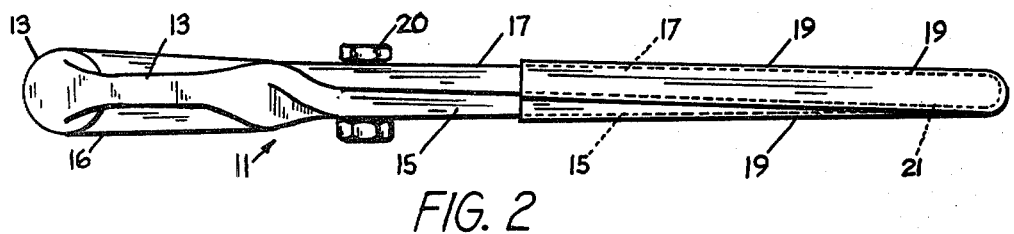
FIG. 2 is a plan view of the disclosure of FIG. 1.
Figure 3:
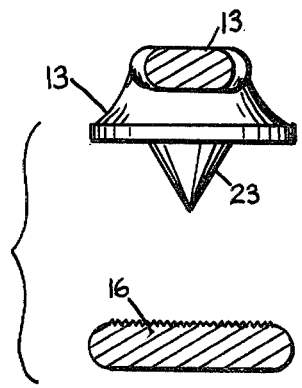
FIG. 3 is an enlarged front elevational view in section on the line 3—3 of FIG. 1.

With reference now to the drawings, the numeral 11 generally designates the gripping tool which comprises an upper jaw member 13 having an integrally formed lower handle member 15, and a lower jaw member 16 having an integrally formed upper handle member 17. Said members 13-17 are preferably made of forged or cast stainless steel or other corrosion-resistant materials and are joined at their cross-over zones by a pivot element 20 of conventional construction. Both handle members are desirably provided, for comfortable gripping, with somewhat resilient plastic sheaths 19, formed e.g. by dip-coating. The lower handle member has a downwardly and forwardly curved free end 21 to partly embrace the hand of a user as an aid to a pulling action.

The gripping surfaces of the jaw members 13 and 16 are roughly parallel and spaced as shown in full lines in FIG. 1 when the handle members 15 and 17 are in their parallel and maximized gripping positions likewise so shown. In said positions, the lower jaw 16 would be inserted into the mouth of a large fish or animal, but it could underlie the lower jaw of a small fish or animal.

An important feature of the invention lies in the provision of a sharp-tipped blunt-tapered conical point 23 formed on the lower flat face of the upper jaw 13, or fixed thereto if made of a dulling-resisting material. This point 13 not only grips the game, but by penetrating the skull of the fish or animal also kills or immobilizes it. Further, the tool parts are so proportioned that the tip of the penetrating gripping point 23 will be protectedly at least slightly spaced from the lower jaw when the handle members engage, as is phantom-shown in FIG. 1.

The bluntly tapered smooth-sided point 23 produces a relatively large smooth-surfaced holding aperture in the tissue being gripped between the opposed flat surfaces of the jaws. This two-effects tear-resisting holding-action is thus analogous to the well-known tear-resisting and firm holding-actions of grommets.

The tool is designed to give a fisherman a device which will give him complete control of an animal or a fish during skinning or scaling. The tool will hold a fish in a firm, non-slip grip, eliminating slimy hands and cuts from sharp fins.

Figure 5:
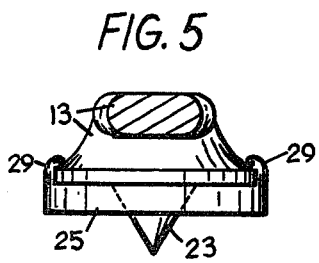
FIG. 5 is a view similar to FIG. 3 and showing an added small-game adapter.
Figure 6:
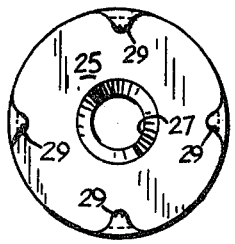
FIG. 6 is a plan view of the adapter shown in FIG. 5.
Figure 4:
FIG. 4 is an enlarged fragmentary elevational view in section on the line 4—4 of FIG. 1.

An optional refinement feature is disclosed in FIGS. 5 and 6. It comprises a flat disc 25 having a central aperture 27 tapered to snugly embrace the base of the tapered point 23. A plurality of snap-over fingers 29 engage the periphery of the upper jaw 13 to removably fasten the disc 25 thereto. The disc 25 adjusts the tool for use with small fish (e.g. under five pounds) while the tool without the disc is designed for use with fish up to ten pounds.

The invention having been described, what is claimed is:

1. A pliers-shaped tool for gripping fish for skinning or scaling, or animals for skinning, comprising: a lower mouth-insertable jaw member having an upper relatively wide and flat surface and having an integrally connected rearwardly extending upper handle member, an upper jaw member having a rearwardly extending integral lower handle member and having a depending bluntly tapered sharp-tipped skull-penetrating point completely surrounded around its base by a relatively wide and flat gripping surface roughly parallel in use to said upper relatively flat surface of said lower jaw member, and pliers-like pivot means interconnecting said jaw members and their integrally connected handle members at their pliers-like overlapped cross-over zones.

2. A tool according to claim 1 and additionally comprising a somewhat resilient covering for the grip portions of said handle members.

3. A tool according to claim 2, said covering being plastic material dip-coated on said handle members.

4. A tool according to claim 1, said members being formed from strips of material with the jaw members being twisted at right angles from the planes of the surfaces of said handle members and said cross-over zones.

5. A tool according to claim 1, said lower handle member having a downwardly and forwardly curved free end to provide a hand-partly-embracing means to aid in a pulling action.

6. A tool according to claim 1, said penetrating point being cone-shaped and having a taper of the order of sixty degrees.

7. A tool according to claim 1, said members being so shaped and proportioned that the sharp tip of said penetrating point will be protectedly at least slightly spaced from said lower jaw member when said handle members inter-engage.

8. A tool according to claim 1 and additionally comprising a flat disc centrally apertured to snugly embrace the base of said tapered point to adapt said tool for gripping smaller fish or animals by reducing the effective dimensions of said point and of the closed gap between the jaw surfaces.

9. A tool according to claim 8 wherein said disc has a plurality of peripherally spaced fingers for snap-over retaining engagement with the periphery of said upper jaw member.

10. A tool according to claim 1 wherein at least one of the tissue-engaging flat surfaces of said jaws is serrated for improved holding action.

* * * * *